US008638710B2

(12) United States Patent
Palanki et al.

(10) Patent No.: US 8,638,710 B2
(45) Date of Patent: Jan. 28, 2014

(54) INCREMENTAL REDUNDANCY RELAYS FOR BROADCAST TRANSMISSION

(75) Inventors: Ravi Palanki, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 12/262,573

(22) Filed: Oct. 31, 2008

(65) Prior Publication Data

US 2010/0110966 A1 May 6, 2010

(51) Int. Cl.
*H04J 3/08* (2006.01)
*H04L 12/56* (2011.01)
*H04B 3/36* (2006.01)
*H04B 7/00* (2006.01)

(52) U.S. Cl.
USPC ............ 370/315; 370/395.4; 370/500; 455/7; 455/70

(58) Field of Classification Search
None
See application file for complete search history.

(56) References Cited

U.S. PATENT DOCUMENTS

| 7,697,484 | B2 | 4/2010 | Kim et al. | |
|---|---|---|---|---|
| 2006/0239222 | A1 | 10/2006 | Kim et al. | |
| 2007/0011555 | A1* | 1/2007 | Kim et al. | 714/749 |
| 2007/0066240 | A1* | 3/2007 | Hart | 455/69 |
| 2007/0070953 | A1* | 3/2007 | Yoon et al. | 370/334 |
| 2007/0070954 | A1* | 3/2007 | Kim et al. | 370/334 |
| 2008/0045145 | A1* | 2/2008 | Nakatsugawa | 455/11.1 |
| 2008/0049718 | A1* | 2/2008 | Chindapol et al. | 370/351 |
| 2008/0056173 | A1* | 3/2008 | Watanabe | 370/315 |
| 2008/0076432 | A1 | 3/2008 | Senarath et al. | |
| 2008/0084837 | A1 | 4/2008 | Watanabe et al. | |
| 2008/0160912 | A1* | 7/2008 | Kim et al. | 455/15 |
| 2008/0285499 | A1* | 11/2008 | Zhang et al. | 370/315 |
| 2009/0016259 | A1* | 1/2009 | Zhang et al. | 370/315 |
| 2009/0154533 | A1* | 6/2009 | Khayrallah et al. | 375/211 |
| 2009/0175214 | A1* | 7/2009 | Sfar et al. | 370/315 |
| 2010/0014478 | A1 | 1/2010 | Futagi et al. | |
| 2010/0097976 | A1 | 4/2010 | Agrawal et al. | |

FOREIGN PATENT DOCUMENTS

| CN | 101127551 A | 2/2008 |
|---|---|---|
| CN | 101137091 A | 3/2008 |
| CN | 101199142 A | 6/2008 |
| CN | 101300748 A | 11/2008 |

(Continued)

OTHER PUBLICATIONS

U.S. Appl. No. 61/046,768, Chitrapu et al., Relay Cooperation in Wireless Communications, Apr. 21, 2008, i.e. Fig. 14, pp. 17-19.*
Agustin, et al. :"Hybrid Turbo FEC/ARQ Systems and Distributed Space-Time Coding for Cooperative Transmission," Intl Journal of Wireless Information Networks, Kluwer Academic Publishers/Plenum Publishers, NE, vol. 12, No. 4 Dec 1, 2005, pp. 263-280 ISSN: 1572-8129.

(Continued)

*Primary Examiner* — Chirag Shah
*Assistant Examiner* — Ashley Shivers
(74) *Attorney, Agent, or Firm* — John J. Ketchum

(57) ABSTRACT

Techniques for relaying a broadcast transmission in a wireless network are described. In one design, a relay may receive at least one transmission of a packet from a transmitter (e.g., a broadcast station) and may process the at least one transmission to decode the packet. The relay may generate at least one remaining transmission of the packet after correctly decoding the packet. The transmitter may broadcast multiple transmissions of the packet to receivers. The at least one transmission may be at least one of the multiple transmissions, and the at least one remaining transmission may be remaining ones of the multiple transmissions. The relay may send the at least one remaining transmission of the packet at the same time and on the same resources used by the transmitter. The multiple transmissions may be HARQ transmissions containing different redundancy information for the packet.

38 Claims, 8 Drawing Sheets

(56) References Cited

FOREIGN PATENT DOCUMENTS

| | | | |
|---|---|---|---|
| JP | 2006211313 A | 8/2006 |
| JP | 2007336583 A | 12/2007 |
| JP | 2008011550 A | 1/2008 |
| JP | 2008098758 A | 4/2008 |
| JP | 2009188926 A | 8/2009 |
| WO | 2007037638 A2 | 4/2007 |
| WO | 2007132196 A1 | 11/2007 |
| WO | WO2008024158 | 2/2008 |
| WO | 2008105162 A1 | 9/2008 |

OTHER PUBLICATIONS

Herhold, et al: "Cooperative Multi-Hop Transmission in Wireless Networks," Computer Networks, vol. 49, No. 3, Oct 19, 2005, pp. 299-324, Elsevier Science Publishers BV, Amsterdam, NL, ISSN: 1389-1286.
International Search Report PCT/US08/088323, International Search Authority European Patent Office Nov. 2, 2010.
International Search Report/Written Opinion—PCT/US08/088323—International Search Authority EPO—Feb. 11, 2010.
Taiwanese Search report—097151660—TIPO—Dec. 20, 2011.
Taiwan Search Report—TW097151660—TIPO—Aug. 17, 2012.

\* cited by examiner

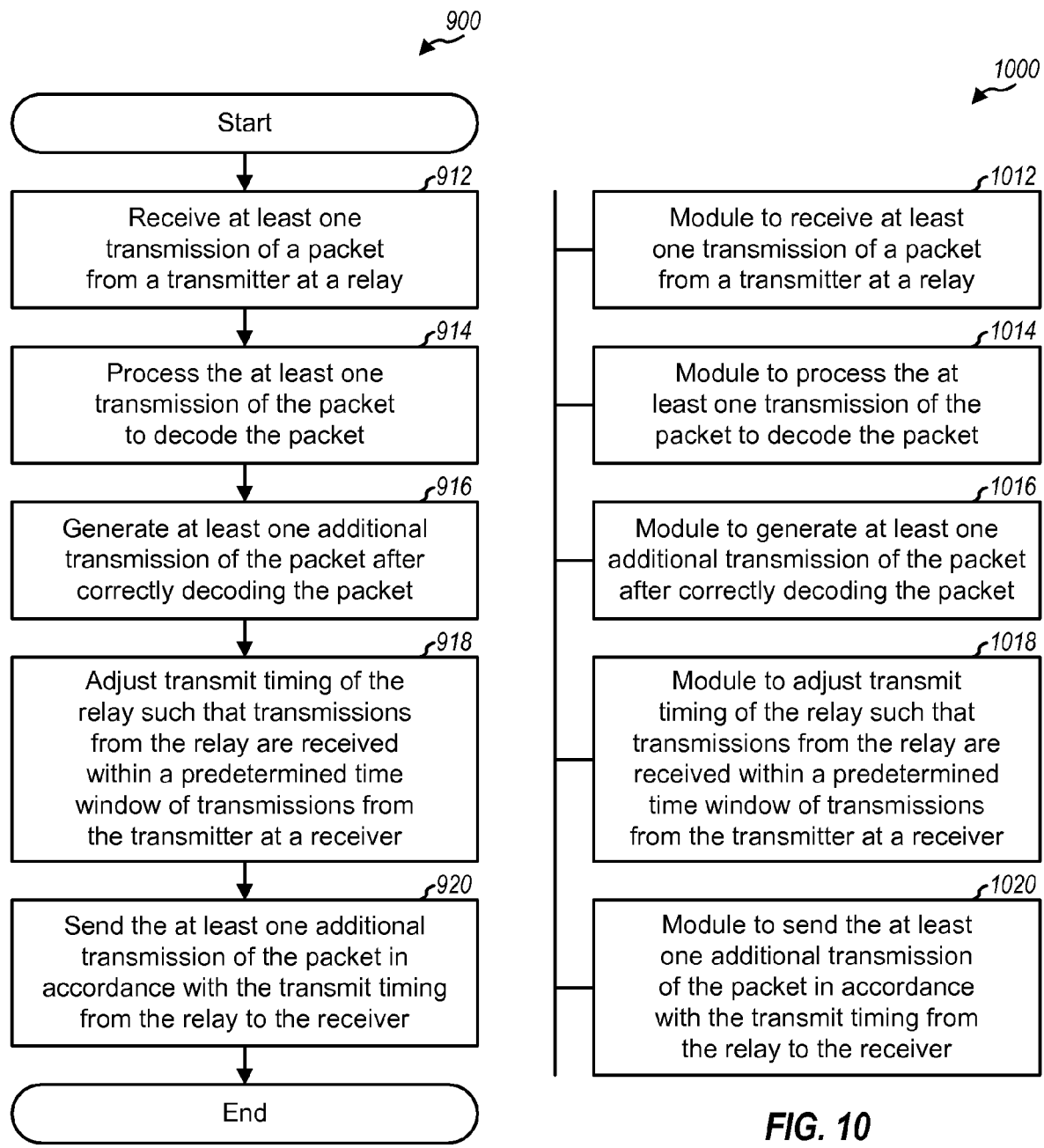

INCREMENTAL REDUNDANCY RELAYS FOR BROADCAST TRANSMISSION

BACKGROUND

I. Field

The present disclosure relates generally to communication, and more specifically to transmission techniques for wireless communication.

II. Background

Wireless communication networks are widely deployed to provide various communication services such as voice, video, packet data, messaging, broadcast, etc. These wireless networks may be broadcast networks that broadcast information to users, multiple-access networks that support bi-directional communication for users, etc. A multiple-access network may support unicast transmission to a specific user, multicast transmission to a group of users, and/or broadcast transmission to all users.

A wireless network may broadcast information to users in the network. It may be desirable to improve the coverage of a broadcast transmission. This may be achieved by using radio frequency (RF) repeaters. An RF repeater may receive an RF signal, amplify the received RF signal, and transmit the amplified RF signal. The RF repeater may amplify a desired signal as well as interference. Furthermore, noise from RF circuitry within the RF repeater may be injected in the amplified RF signal and may degrade the desired signal. RF repeaters may thus improve link budget but may cause a loss in network capacity.

There is therefore a need in the art for more effective techniques to improve coverage for a broadcast transmission.

SUMMARY

Techniques for relaying a broadcast transmission in a wireless communication network are described herein. In an aspect, a relay may relay a broadcast transmission by (i) receiving and processing at least one transmission of a packet from a transmitter to decode the packet and (ii) generating and sending remaining transmissions of the packet after correctly decoding the packet. The transmissions of the packet may be hybrid automatic repeat request (HARQ) transmissions comprising different redundancy information for the packet.

In one design, a relay may receive at least one transmission of a packet from a transmitter, which may be a broadcast station, a base station, etc. The relay may process the at least one transmission of the packet to decode the packet. The relay may generate at least one remaining transmission of the packet after correctly decoding the packet. The transmitter may broadcast multiple transmissions of the packet to receivers. The at least one transmission may be at least one of the multiple transmissions of the packet, and the at least one remaining transmission may be remaining ones of the multiple transmissions. The relay may send the at least one remaining transmission of the packet.

The relay may determine a packet format used by the transmitter for the packet. The relay may process the at least one transmission of the packet from the transmitter in accordance with the packet format to decode the packet. The relay may also generate the at least one remaining transmission of the packet in accordance with the packet format. The relay may determine resources used by the transmitter to send the at least one remaining transmission of the packet. The relay may then send the at least one remaining transmission of the packet on the resources used by the transmitter.

Various aspects and features of the disclosure are described in further detail below.

BRIEF DESCRIPTION OF THE DRAWINGS

FIG. 9 shows a process for relaying transmissions with timing adjustment.

FIG. 10 shows an apparatus for relaying transmissions with timing adjustment.

DETAILED DESCRIPTION

The transmission techniques described herein may be used for various wireless communication networks such as broadcast networks, multiple-access networks, etc. The terms "network" and "system" are often used interchangeably. The techniques may be used for broadcast networks implementing radio technologies such as MediaFLO™, Digital Video Broadcasting for Handhelds (DVB-H), Integrated Services Digital Broadcasting for Terrestrial Television Broadcasting (ISDB-T), etc. The techniques may also be used for multiple-access networks such as wireless wide area networks (WWANs), wireless metropolitan area networks (WMANs), wireless local area networks (WLANs), etc. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) is an upcoming release of "3rd Generation Partnership Project" (3GPP) that uses E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The transmission techniques described herein may be used for the radio technologies mentioned above as well as other radio technologies.

Figure 1:
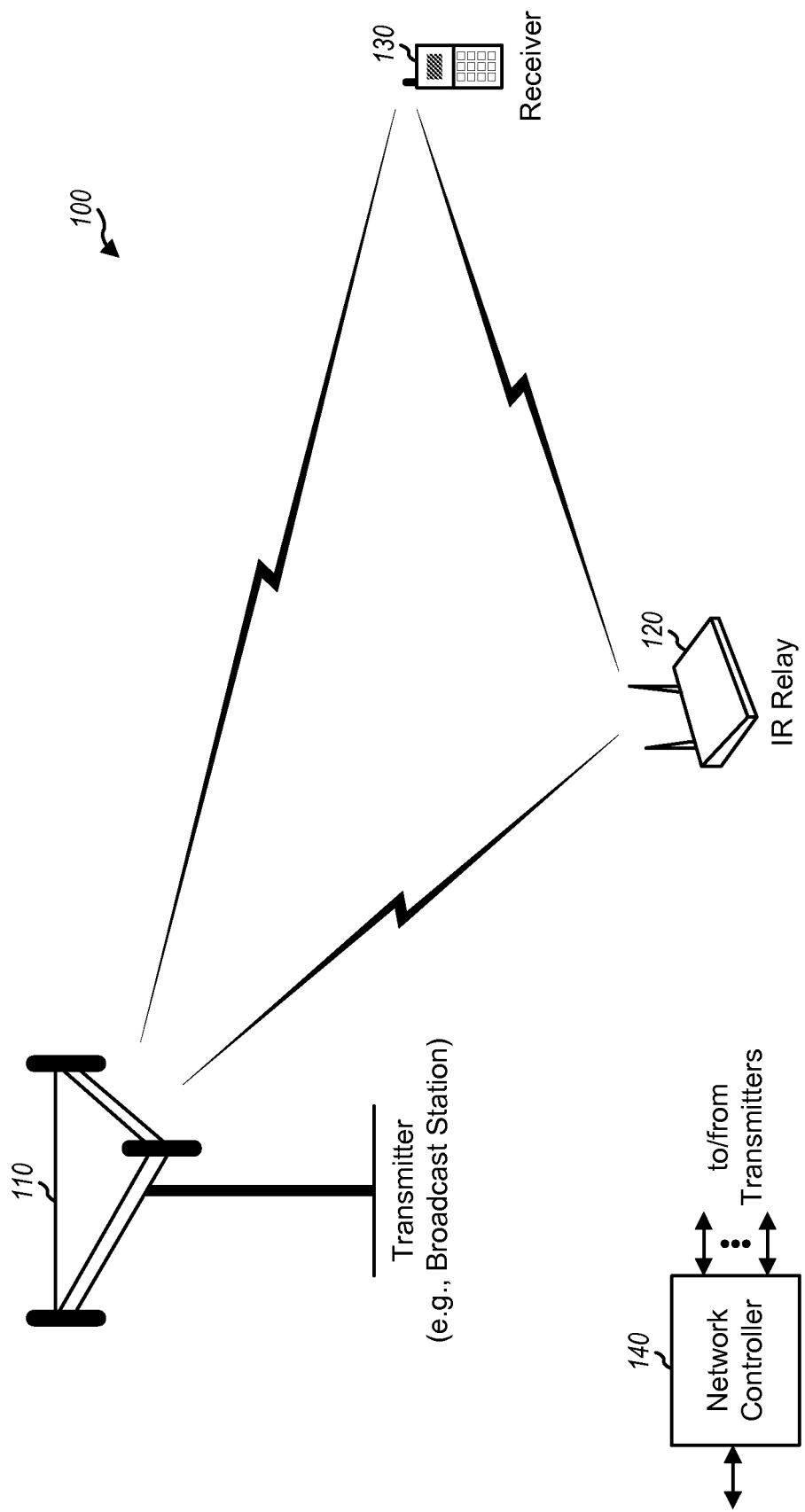
FIG. 1 shows a wireless communication network.

FIG. 1 shows a wireless communication network 100. For simplicity, only one transmitter 110, one incremental redundancy (IR) relay 120, one receiver 130, and one network controller 140 are shown in FIG. 1. In general, a wireless network may include any number of entities of each type.

Transmitter 110 may be a station that broadcasts information to receivers. Transmitter 110 may be a broadcast station in a broadcast network, a base station in a multiple-access network, a satellite in a satellite network, etc. A base station may also be referred to as a Node B, an evolved Node B (eNode B), an access point, etc. Transmitter 110 may send broadcast transmissions and may also send unicast and/or multicast transmissions. Network controller 140 may couple to a set of transmitters and provide coordination and control for the transmitters.

Receiver 130 may be a station capable of receiving information from a transmitter. Receiver 130 may be located anywhere within the network and may be stationary or mobile. Receiver 130 may be a broadcast receiver capable of only receiving broadcast information from a broadcast network. Receiver 130 may also be part of a terminal capable of bi-directional communication with a multiple-access network. A terminal may also be referred to as an access terminal, a mobile station, a user equipment, a subscriber station, a station, etc. Receiver 130 may be part of a cellular phone, a personal digital assistant (PDA), a wireless communication device, a handheld device, a wireless modem, a laptop computer, a cordless phone, a wireless local loop (WLL) station, etc. Receiver 130 may receive transmissions from transmitter 110 on the forward link (or downlink). Receiver 130 may also be able to send transmissions to transmitter 110 and/or other stations on the reverse link (or uplink). Receiver 130 may also receive transmissions from IR relay 120, with or without knowledge of receiver 130.

IR relay 120 may be a station that receives transmissions of packets and sends additional transmissions of the packets. IR relay 120 may receive a forward link signal from transmitter 110, process transmissions to decode a packet, and transmit a relay signal containing additional transmissions of the packet. IR relay 120 may improve the coverage of transmitter 110 and may also improve the performance of receiver 130, as described below.

In general, transmitter 110 may transmit to any number of receivers within its coverage. IR relay 120 may also transmit to any number of receivers within its coverage. IR relay 120 may also receive and relay transmissions for any number of transmitters. Receiver 130 may receive transmissions from any number of transmitters and any number of IR relays. For simplicity, much of the description below describes (i) transmitter 110 transmitting to receiver 130 and (ii) IR relay 120 receiving from transmitter 110 and transmitting to receiver 130.

The network may utilize HARQ, which may also be referred to as incremental redundancy. With HARQ, a transmitter may send one or more transmissions of a packet of data, one transmission at a time, until the packet is decoded correctly by a receiver, or the maximum number of transmissions has been sent, or some other termination condition is encountered. For a broadcast transmission, the transmitter may send all transmissions of the packet, regardless of decoding results at the receivers. HARQ may improve reliability for data transmission.

Figure 2:
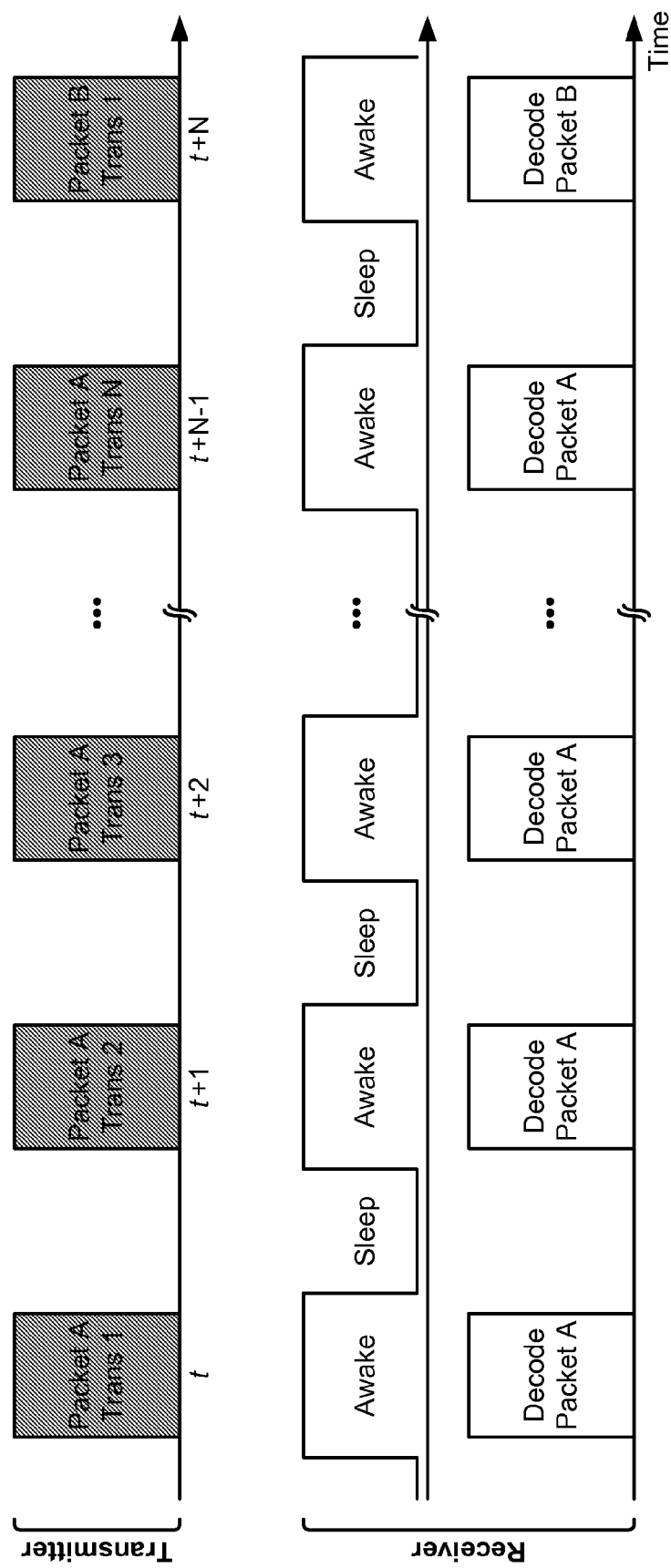
FIG. 2 shows a design of sending a broadcast transmission.

FIG. 2 shows a design of sending a broadcast transmission with HARQ. Transmitter 110 may have information to broadcast to all receivers within its coverage. Transmitter 110 may select a packet format such that the broadcast information can be reliably received by all or many receivers within its coverage. A packet format may also be referred to as a transport format, a modulation and coding scheme (MCS), a rate, etc. The selected packet format may be associated with a specific modulation scheme, a specific code rate or coding scheme, a specific packet size, etc. The selected packet format may be known a priori by all receivers or may be sent (e.g., on a broadcast channel) to the receivers.

Transmitter 110 may process (e.g., encode and modulate) a packet of broadcast information (Packet A) in accordance with the selected packet format and generate data symbols for N transmissions of Packet A. Each transmission of the packet may be referred to as an HARQ transmission. The N different transmissions of the packet may contain different redundancy information for the packet and may be used to decode the packet. Transmitter 110 may send a first transmission (Trans 1) of Packet A at time t to all receivers. Receiver 130 may receive and process (e.g., demodulate and decode) the first transmission and determine that Packet A is decoded in error. Transmitter 110 may send a second transmission (Trans 2) of Packet A at time t+1 to all receivers. Receiver 130 may receive the second transmission, process the first and second transmissions to decode packet A, and determine that Packet A is decoded in error. Transmitter 110 may send each remaining transmission of Packet A at a respective time to all receivers. In the example shown in FIG. 2, receiver 130 may be located far away from transmitter 110 and may not be able to correctly decode Packet A after each of the first N−1 transmissions of packet A. Receiver 130 may receive the last transmission (Trans N) of Packet A, process all N transmissions to decode packet A, and determine that Packet A is decoded correctly.

Transmitter 110 may process and send the next packet in similar manner. Transmitter 110 may send all N transmissions of each packet since the packet is intended for all receivers and transmitter 110 does not know how many transmissions are needed by each receiver to correctly decode the packet. If a receiver can correctly decode a packet with fewer than N transmissions, then the receiver may simply ignore the remaining transmissions of the packet.

The transmission timeline may be partitioned into units of subframes, and each subframe may have a particular time duration. Multiple (M) HARQ interlaces may be defined, with each HARQ interlace containing subframes that are spaced apart by M subframes. The M HARQ interlaces may be offset from one another by one subframe. All transmissions of a given packet may be sent in different subframes of one HARQ interlace. Different packets may be sent in parallel in a time interlaced manner on the M HARQ interlaces.

Receiver 130 may be portable and powered by an internal battery. To conserve battery power and extend battery life, receiver 130 may be powered down when not receiving any transmissions. For a packet not yet decoded correctly, receiver 130 may wake up prior to each transmission of the packet, receive the transmission, and process all received transmissions to decode the packet. Upon correctly decoding the packet, receiver 130 may sleep through remaining transmissions of the packet. In the example shown in FIG. 2, receiver 130 may wake up for all N transmissions of Packet A since it was not able to correctly decode Packet A after any of the N−1 earlier transmissions. Although not shown in FIG. 2 for simplicity, receiver 130 may receive transmissions of multiple packets in a time interlaced manner and may remain awake whenever any one of these transmissions is sent.

IR relay 120 may be used to improve performance of broadcast transmission. IR relay 120 may achieve this improvement with or without coordination through transmitter 110. Receiver 130 may be affected by IR relay 120 but may or may not be aware of the presence of IR relay 120.

Figure 3:
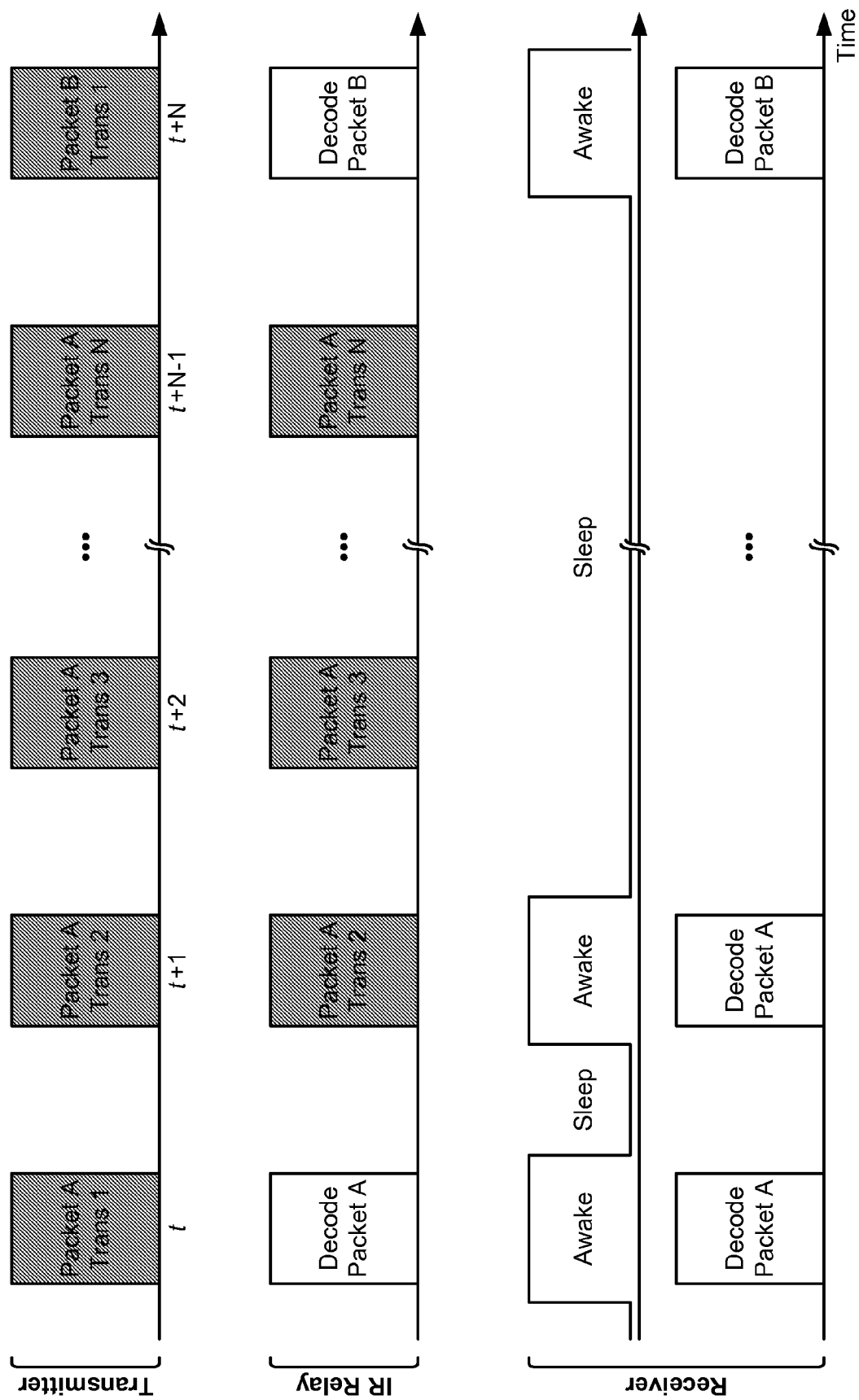
FIG. 3 shows a design of sending and relaying a broadcast transmission.

FIG. 3 shows a design of sending and relaying a broadcast transmission with HARQ. Transmitter 110 may have information to broadcast to all receivers within its coverage. Transmitter 110 may process (e.g., encode and modulate) a packet of broadcast information (Packet A) in accordance with a selected packet format and generate data symbols for N transmissions of Packet A. Transmitter 110 may send a first transmission of Packet A at time t to all receivers. IR relay 120 may receive the first transmission from transmitter 110 and may process the first transmission to decode Packet A. In the example shown in FIG. 3, IR relay 120 correctly decodes packet A based on the first transmission. Receiver 130 may also receive and process the first transmission and may determine that Packet A is decoded in error.

Transmitter 110 may send a second transmission of Packet A at time t+1 to all receivers. IR relay 120 may generate the second and subsequent transmissions of packet A in the same manner as transmitter 110 based on the decoded packet A. IR relay 120 may send the second transmission of Packet A at the same time and on the same resources used by transmitter 110 for the second transmission. Receiver 130 may receive the second transmission from both transmitter 110 and IR relay 120. Receiver 130 may process the first and second transmissions to decode packet A and may determine that Packet A is decoded in correctly.

Transmitter 110 may send each remaining transmission of Packet A at a respective time to all receivers. IR relay 120 may also send each remaining transmission of Packet A on the same resources and at the same time as transmitter 110. Since receiver 130 has already successfully decoded Packet A after the second transmission, receiver 130 can skip the remaining transmissions of Packet A and may sleep through these transmissions if there are no other tasks to perform, as shown in FIG. 3.

The number of transmissions (N) of a packet, the duration of each transmission, and the time interval between consecutive transmissions may be dependent on the design of the network. For MediaFLO™, four transmissions of a packet are sent in four frames, with each frame having a duration of 250 milliseconds (ms). Each transmission may be sent in a fraction of a frame in order to reduce the amount of time needed to receive the transmission. Multiple packets may also be jointly encoded and sent in N transmissions.

IR relay 120 may be able to correctly decode packets at high rate from transmitter 110 and may transmit the rest of the symbols for the decoded packets to receiver 130. For example, transmitter 110 may encode a packet of 1000 information bits with a rate ⅓ code to generate 3000 code bits. Transmitter 110 may generate six transmissions of the packet, with each transmission carrying 500 code bits. IR relay 120 may have sufficiently high signal-to-noise ratio (SNR) for transmitter 110 and may be able to correctly decode the packet at rate ⅔. IR relay 120 may thus be able to correctly decode the packet with 1500 code bits from three transmissions of the packet. IR relay 120 may then encode the decoded packet with the same rate ⅓ code to generate 3000 code bits. IR relay 120 may discard the first 1500 code bits and may generate the last three transmissions of the packet with the last 1500 code bits, in the same manner as transmitter 110. IR relay 120 may send these last three transmissions on the same resources and at the same time as transmitter 110.

Receiver 130 may receive the first three transmissions from transmitter 110 and may receive the last three transmissions from both transmitter 110 and IR relay 120. If transmitter 110 and IR relay 120 send the transmissions using OFDM or SC-FDM, then receiver 130 can receive the transmissions from transmitter 110 and IR relay 120 without having to perform equalization. Receiver 130 may compute log-likelihood ratios (LLRs) for the first 1500 code bits based on the three transmissions received from transmitter 110, which may have low SNR. Receiver 1300 may compute LLRs for the last 1500 code bits based on the last three transmissions received from both transmitter 110 and IR relay 120, which may have higher SNR. Receiver 130 may use the LLRs for all 3000 code bits to decode the packet. Receiver 130 may attempt decoding after each transmission of the packet and, depending on channel conditions, may be able to correctly decode the packet with fewer than six transmissions.

In general, the number of remaining transmissions sent by IR relay 120 may be dependent on various factors such as the number of transmissions (N) sent by transmitter 110, the code rate used by transmitter 110, the SNR at IR relay 120 for transmitter 110, etc. IR relay 120 may send more transmissions if transmitter 110 uses a lower code rate and/or if the SNR at IR relay 120 is higher.

IR relay 120 may relay traffic data, e.g., as described above for FIG. 3. IR relay 120 may also relay other information from transmitter 110. In one design, IR relay 120 may relay a broadcast/overhead channel carrying system information used to receive transmissions from transmitter 110. For example, the system information may convey the system bandwidth, the FFT size, the cyclic prefix length, etc. In another design, IR relay 120 may relay a control channel carrying assignment messages from transmitter 110. An assignment message may indicate a packet format, resources used for transmission, and/or other pertinent information used to receive transmissions of a packet. In one design, an assignment message may be sent for a packet or a set of packets and may be relayed along with transmissions of the packet(s). In another design, an assignment message may include multiple information elements or payloads. Each information element may be for a packet or a set of packets and may be independently decodable. Each information element may describe what will be transmitted in a corresponding subframe or HARQ interlace. For example, an information element for subframe q may describe data bandwidth allocation for subframe q.

In general, IR relay 120 may relay transmissions of any data or information sent by transmitter 110. IR relay 120 may obtain pertinent parameters such as the resources to use to send transmissions of a packet, a packet format for the packet, the number of transmissions (N) to send for the packet, etc. IR relay 120 may attempt to decode the packet after each transmission received from transmitter 110, in the same manner as receiver 130. The link from transmitter 110 to IR relay 120 may be better than the link from transmitter 110 to receiver 130. IR relay 120 may then be able to successfully decode the packet with fewer transmissions than receiver 130. After successfully decoding the packet, IR relay 120 may generate remaining transmissions of the packet based on the decoded packet and in the same manner as transmitter 110. IR relay 120 may send each remaining transmission on the same resources as transmitter 110.

Receiver 130 may receive transmissions from transmitter 110 and possibly IR relay 120. Receiver 130 may not need to know where the transmissions are coming from and may not need to know the presence of IR relay 120. Transmitter 110 may also not need to know whether IR relay 120 is present and sending transmissions of packets.

In another design that is not shown in FIG. 3, IR relay 120 may (i) act as an RF repeater and transmit a repeated signal until a packet is decoded correctly and (ii) act as a relay and transmit a relay signal after the packet is decoded correctly. Before correctly decoding the packet, IR relay 120 may receive a forward link signal from transmitter 110, recondition (e.g., amplify and filter) the received signal to generate the repeated signal, and transmit the repeated signal to receiver 130. After successfully decoding the packet, IR relay 120 may generate remaining transmissions of the packet based on the decoded packet, generate the relay signal with these transmissions of the packet, and transmit the relay signal to receiver 130. This design may improve performance for earlier transmissions of the packet.

Regardless of whether or not IR relay 120 transmits a repeated signal, improved performance may be achieved due to a higher quality relay signal generated by IR relay 120. The relay link from IR relay 120 to receiver 130 may be better than the direct link from transmitter 110 to receiver 130. Receiver 130 may be able to receive the transmissions from IR relay 120 with better quality than the transmissions from transmitter 110. Hence, receiver 130 may be able to correctly decode a packet sent by transmitter 110 with fewer transmissions due to assistance from IR relay 120.

IR relay 120 may be used to improve performance of broadcast transmission. IR relay 120 may allow receiver 130 to successfully decode a packet after fewer transmission and to sleep during more transmissions, as shown in FIG. 3. This may extend battery life of receiver 130, which may be desirable for a receiver continually receiving one or more broadcast streams from a broadcast network. IR relay 120 may also enhance coverage and allow receiver 130 to be located farther away from transmitter 110 and still be able to successfully decode packets from transmitter 110. IR relay 120 may also improve spectral efficiency and allow transmitter 110 to send (i) fewer transmissions of the packet or (ii) more data in the same number of transmissions.

In one design, a forward link signal from transmitter 110 and a relay signal from IR relay 120 may have the same waveform for a packet being transmitted. Transmitter 110 and IR relay 120 may then appear as two stations in a single frequency network (SFN) to receiver 130. For this design, receiver 130 may process a received signal comprising both the forward link signal and the relay signal. Receiver 130 may not need to distinguish between the two signals and may not need to be aware of the presence of IR relay 120. In another design, the relay signal may be distinguishable from the forward link signal. In this design, receiver 130 may receive the forward link signal and the relay signal and may process both signals or only the stronger signal.

In one design, a transmission of a packet from transmitter 110 may comprise data symbols on resources used for data (or data resources) as well as pilot symbols on resources used for pilot (or pilot resources). Pilot is data that is known a priori by a transmitter and a receiver and may also be referred to as reference signal, training, preamble, etc. A transmission of the packet from IR relay 120 may also comprise data symbols on the data resources and pilot symbols on the pilot resources. Sending pilot symbols from both transmitter 110 and IR relay 120 on the same resources may allow receiver 130 to derive a channel estimate for the links for both transmitter 110 and IR relay 120. Receiver 130 may derive a channel estimate for each transmission of the packet based on the received pilot symbols for that transmission. Receiver 130 may then perform coherent detection for the received data symbols for each transmission based on the channel estimate obtained for that transmission, without having to know the individual channel responses for transmitter 110 and IR relay 120.

In one design, IR relay 120 may send transmissions of a packet such that the transmissions from transmitter 110 and the transmissions from IR relay 120 are approximately time aligned at receiver 130. This may reduce frequency selectivity of the received signal at receiver 130 and may improve performance.

Figure 4:
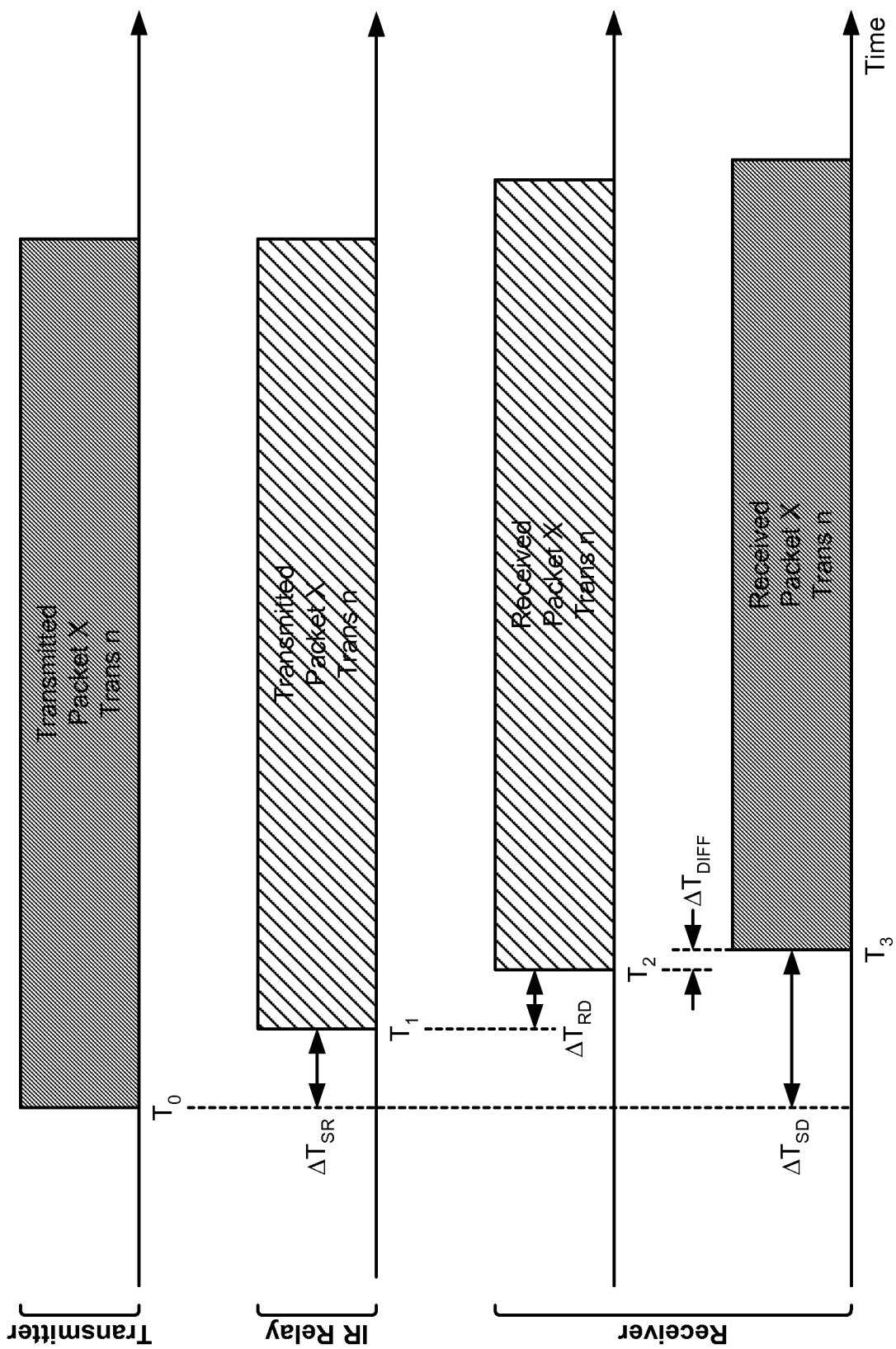
FIG. 4 shows transmissions of a packet from a transmitter and a relay.

FIG. 4 shows a design for sending transmissions of a packet from transmitter 110 and IR relay 120. Transmitter 110 may send a transmission of the packet starting at time $T_0$. IR relay 120 may send the same transmission of the packet starting at time $T_1$, which may be $\Delta T_{SR}$ from $T_0$. Receiver 130 may receive the transmission of the packet from IR relay 120 starting at time $T_2$, which may be $\Delta T_{RD}$ from $T_1$. Receiver 130 may also receive the transmission of the packet from transmitter 110 starting at time $T_3$, which may be $\Delta T_{SD}$ from $T_0$. $\Delta T_{SR}$ may be the propagation delay from transmitter 110 (or source "S") to IR relay 120 (or relay "R"). $\Delta T_{RD}$ may be the propagation delay from IR relay 120 to receiver 130 (or destination "D"). $\Delta T_{SD}$ may be the propagation delay from transmitter 110 to receiver 130.

It may be desirable for the transmissions from transmitter 110 and the transmissions from IR relay 120 to arrive at or near the same time at receiver 130. In one design, receiver 130 may determine a receive timing difference $\Delta T_{DIFF}$, which is the difference between $T_2$ and $T_3$, and may provide the receive timing difference to IR relay 120. IR relay 120 may adjust its transmit timing such that the receive timing difference at receiver 130 is close to zero.

In another design, IR relay 120 may autonomously adjust its transmit timing to reduce the receive timing difference at the receiver. IR relay 120 may determine $\Delta T_{SR}$ and may assume that $\Delta T_{SD}$ is approximately equal to $\Delta T_{SR}$. IR relay 120 may then set its transmit timing to be $\Delta T_{SR}$ from the transmit timing of transmitter 110, i.e., make its transmit timing equal to its receive timing. Alternatively, IR relay 120 may set its transmit timing to be $\Delta T_{SR}$-x from the transmit timing of transmitter 110, where x may be a suitable offset value. The offset x may be selected to reduce the receive timing difference at receiver 130.

In one design, IR relay 120 may send transmissions of packets at a predetermined transmit power level, e.g., the maximum transmit power level. This design may maximize coverage. In another design, IR relay 120 may adjust its transmit power level such that the received power of the transmissions from IR relay 120 is within a predetermined range at receiver 130. IR relay 120 may be located closer to receiver 130 than transmitter 110. IR relay 120 may thus be able to send its transmissions at lower transmit power to receiver 130 while still allowing receiver 130 to achieve sufficiently high SNR for IR relay 120. The lower transmit power may result in less interference in the network. In one design, receiver 130 may send power control commands indicating whether its received power is above or below a target level or range. IR relay 120 may adjust its transmit power level based on the power control commands. In another design, IR relay 120 may estimate pathloss to receiver 130, e.g., based on pilot received from receiver 130. IR relay 120 may then adjust its transmit power based on the estimated pathloss to receiver 130. IR relay 120 may also adjust its transmit power in other manners.

In one design, IR relay 120 may be enabled when it is powered up and may relay transmissions when enabled. In another design, IR relay 120 may be selectively enabled. For example, IR relay 120 may detect for receivers within its vicinity and may be enabled only when at least one receiver is detected. IR relay 120 may also be enabled based on signaling from transmitter 110 and/or receiver 130.

IR relay 120 may enhance coverage and improve spectral efficiency, as described above. IR relay 120 may also be deployed in an unplanned manner, e.g., with an omni-directional antenna. Unlike RF repeaters that simply "amplify and forward" signals, IR relay 120 does not amplify noise and does not cause severe interference when deployed in an unplanned manner. IR relay 120 may be advantageously used in a femto cell/home base station scenario.

Figures 5, 6:
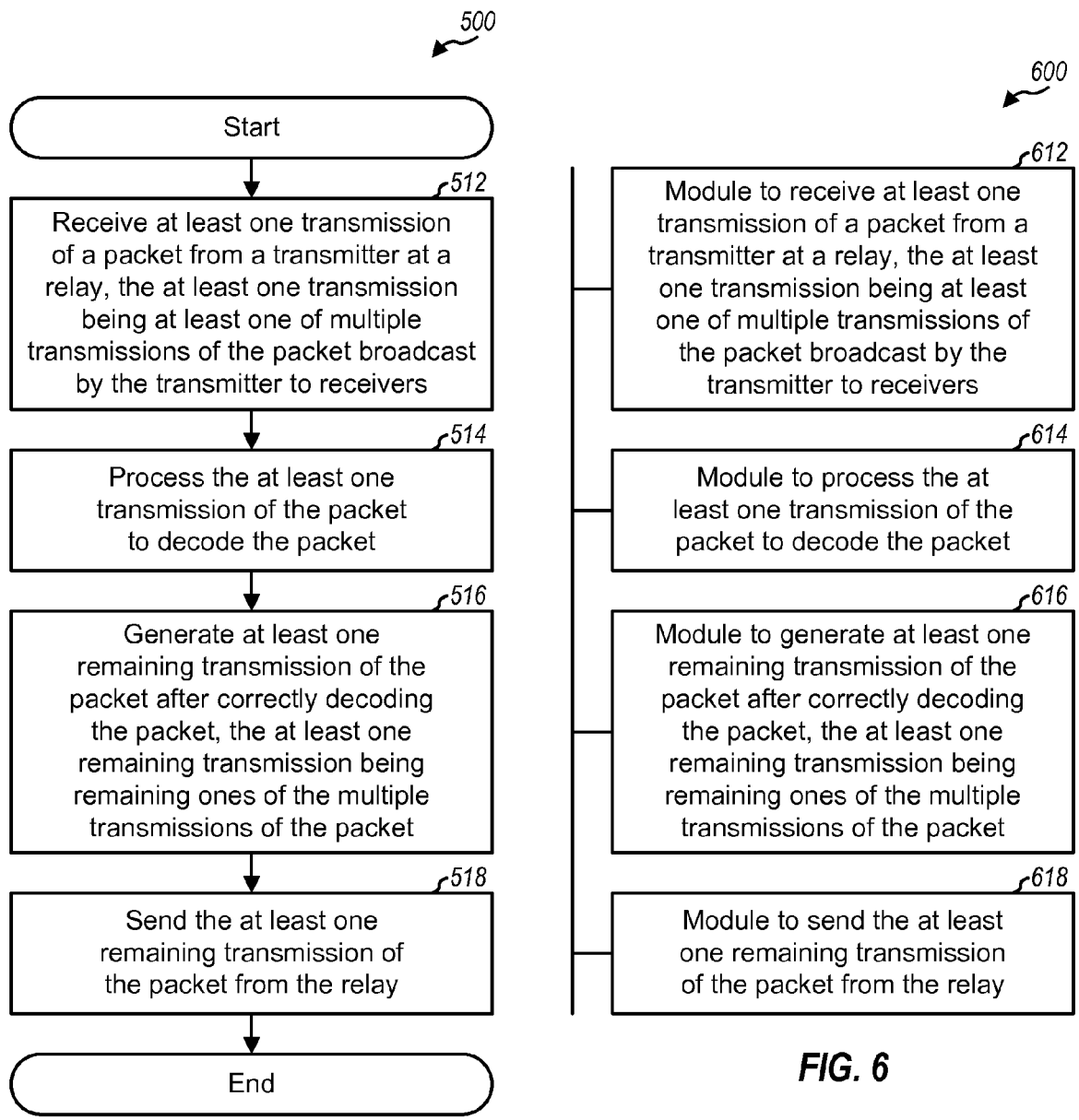
FIG. 5 shows a process performed by a relay.
FIG. 6 shows an apparatus for relaying transmissions of a packet.

FIG. 5 shows a design of a process 500 performed by a relay. The relay may receive at least one transmission of a packet from a transmitter, with the at least one transmission being at least one of multiple transmissions of the packet broadcast by the transmitter to receivers (block 512). The relay may process the at least one transmission of the packet to decode the packet (block 514). The relay may generate at least one remaining transmission of the packet after correctly decoding the packet, with the at least one remaining transmission being remaining ones of the multiple transmissions of the packet (block 516). The relay may send the at least one remaining transmission of the packet, e.g., on the same resources and at the same time as the transmitter (block 518). In one design, the transmitter may be a broadcast station in a broadcast network, and the packet may be for a broadcast stream sent by the broadcast station to the receivers. In other designs, the transmitter may be a base station or some other transmitter.

The transmitter may broadcast a fixed number of transmissions of the packet regardless of decoding results by the receivers. The at least one remaining transmission of the packet sent by the relay may include all transmissions not used by the relay to decode the packet, e.g., the second through N-th transmissions in FIG. 3. The multiple transmissions of the packet may be HARQ transmissions comprising different redundancy information for the packet.

The relay may determine a packet format used by the transmitter for the packet. The relay may process the at least one transmission of the packet from the transmitter in accordance with the packet format to decode the packet. The relay may also generate the at least one remaining transmission of the packet in accordance with the packet format. In one design, the relay may generate each remaining transmission by (i) mapping data symbols for that transmission to resources used by the transmitter for data, (ii) mapping pilot symbols to resources used by the transmitter for pilot, and (iii) generating the transmission based on the mapped data symbols and the mapped pilot symbols. The relay may determine resources used by the transmitter to send the at least one remaining transmission of the packet. The relay may then send the at least one remaining transmission of the packet on the resources used by the transmitter.

In one design, the relay may receive at least one transmission of a message from the transmitter. The message may comprise information used to receive the packet, e.g., system information, an assignment for the packet, etc. The relay may process the at least one transmission of the message to decode the message. The relay may then generate at least one remaining transmission of the message after correctly decoding the message. The relay may send the at least one remaining transmission of the message, e.g., on the same resources and at the same time as the transmitter.

In one design, the relay may adjust its transmit timing such that transmissions from the relay are received within a predetermined time window of transmissions from the transmitter at a receiver. The relay may then send the at least one remaining transmission of the packet in accordance with its transmit timing. In one design, the relay may determine its transmit power level such that the received power of the transmissions from the relay is within a predetermined range at the receiver. The relay may then send the at least one remaining transmission of the packet at the determined transmit power level.

In one design, the relay may send no transmissions of the packet if the packet has not been decoded correctly, e.g., as shown in FIG. 3. In another design, until the packet is decoded correctly, the relay may recondition a signal received from the transmitter and may transmit the reconditioned signal from the relay.

FIG. 6 shows a design of an apparatus 600 for relaying transmissions. Apparatus 600 includes a module 612 to receive at least one transmission of a packet from a transmitter at a relay, with the at least one transmission being at least one of multiple transmissions of the packet broadcast by the transmitter to receivers, a module 614 to process the at least one transmission of the packet to decode the packet, a module 616 to generate at least one remaining transmission of the packet after correctly decoding the packet, with the at least one remaining transmission being remaining ones of the multiple transmissions of the packet, and a module 618 to send the at least one remaining transmission of the packet from the relay.

Figure 7:
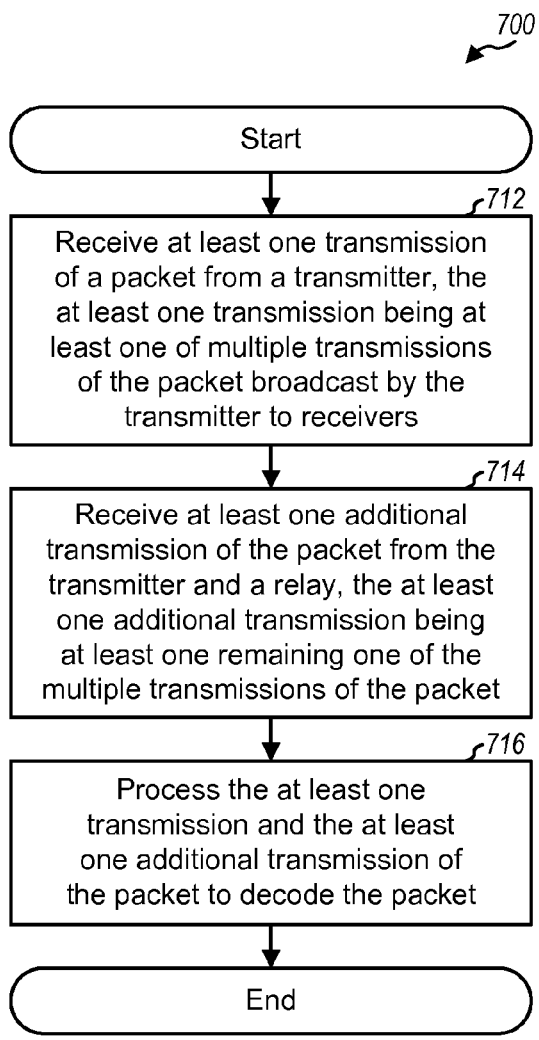
FIG. 7 shows a process performed by a receiver.

FIG. 7 shows a design of a process 700 performed by a receiver, which may be a broadcast receiver, a terminal, etc. The receiver may receive at least one transmission of a packet from a transmitter, with the at least one transmission being at least one of multiple transmissions of the packet broadcast by the transmitter to receivers (block 712). The receiver may also receive at least one additional transmission of the packet from the transmitter and a relay, with the at least one additional transmission being at least one remaining one of the multiple transmissions of the packet (block 714). The at least one additional transmission of the packet may be all or a subset of the remaining transmissions of the packet, e.g., may include just the second transmission in the example shown in FIG. 3. The receiver may process the at least one transmission and the at least one additional transmission of the packet to decode the packet (block 716).

In one design of block 716, the receiver may derive a first channel estimate for the transmitter for each of the at least one transmission of the packet based on pilot symbols in that transmission. The receiver may perform detection for each transmission of the packet based on the first channel estimate for that transmission. The receiver may also derive a second channel estimate for both the transmitter and the relay for each additional transmission of the packet based on pilot symbols in that additional transmission. The receiver may perform detection for each additional transmission of the packet based on the second channel estimate for that additional transmission.

In one design, the receiver may receive at least one transmission of a message from the transmitter. The receiver may also receive at least one additional transmission of the message from the transmitter and the relay. The receiver may process the at least one transmission and the at least one additional transmission of the message to decode the message. The message may comprise information used to receive the packet. For example, the receiver may obtain system information from the message and may receive transmissions of the packet in accordance with the system information. The receiver may obtain an assignment from the message and may receive and process transmissions of the packet in accordance with the assignment.

In one design, the receiver may determine timing adjustment for the relay such that transmissions from the relay are received within a predetermined time window of transmissions from the transmitter at the receiver. The receiver may send the timing adjustment to the relay.

In one design, the receiver may operate in an awake state during the at least one transmission and the at least one additional transmission of the packet, as shown in FIG. 3. The receiver may operate in a sleep state for remaining ones of the multiple transmissions of the packet, as also shown in FIG. 3.

Figure 8:
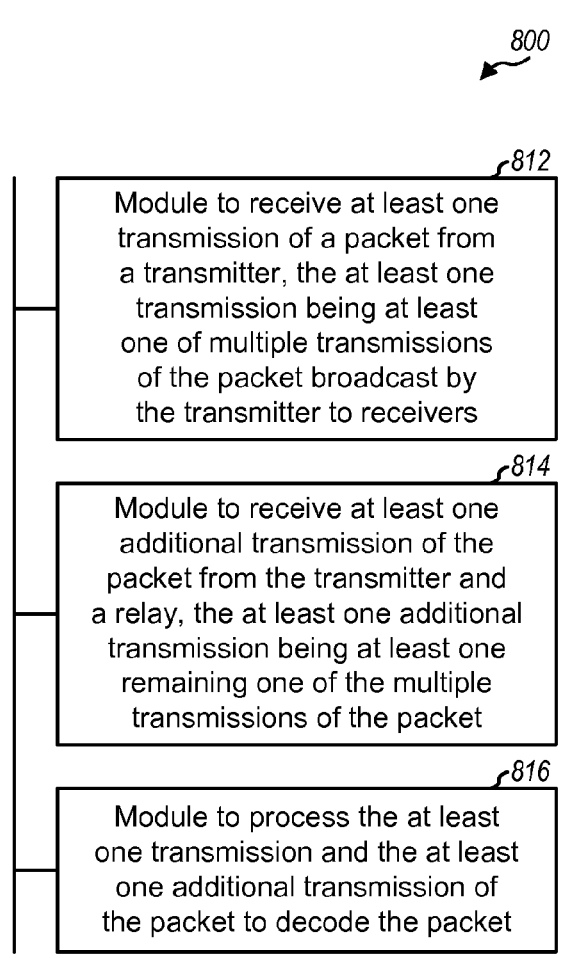
FIG. 8 shows an apparatus for receiving transmissions of a packet.

FIG. 8 shows a design of an apparatus 800 for receiving transmissions. Apparatus 800 includes a module 812 to receive at least one transmission of a packet from a transmitter, with the at least one transmission being at least one of multiple transmissions of the packet broadcast by the transmitter to receivers, a module 814 to receive at least one additional transmission of the packet from the transmitter and a relay, with the at least one additional transmission being at least one remaining one of the multiple transmissions of the packet, and a module 816 to process the at least one transmission and the at least one additional transmission of the packet to decode the packet.

FIG. 9 shows a design of a process 900 for sending transmissions by a relay with timing adjustment. The relay may receive at least one transmission of a packet from a transmitter (block 912). The relay may process the at least one transmission of the packet to decode the packet (block 914). The relay may generate at least one additional transmission of the packet after correctly decoding the packet (block 916). The relay may adjust its transmit timing such that transmissions from the relay are received within a predetermined time window of transmissions from the transmitter at a receiver (block 918). In one design, the relay may receive timing adjustment from the receiver and may adjust its transmit timing in accordance with the timing adjustment. In another design, the relay may determine its receive timing based on the at least one transmission of the packet from the transmitter and may set its transmit timing based on its receive timing. In any case, the relay may send the at least one additional transmission of the packet in accordance with its transmit timing from the relay to the receiver (block 920).

FIG. 10 shows a design of an apparatus 1000 for relaying transmissions with timing adjustment. Apparatus 1000 includes a module 1012 to receive at least one transmission of a packet from a transmitter at a relay, a module 1014 to process the at least one transmission of the packet to decode the packet, a module 1016 to generate at least one additional transmission of the packet after correctly decoding the packet, a module 1018 to adjust transmit timing of the relay such that transmissions from the relay are received within a predetermined time window of transmissions from the transmitter at a receiver, and a module 1020 to send the at least one additional transmission of the packet in accordance with the transmit timing from the relay to the receiver.

The modules in FIGS. 6, 8 and 10 may comprise processors, electronics devices, hardware devices, electronics components, logical circuits, memories, etc., or any combination thereof.

Figure 11:
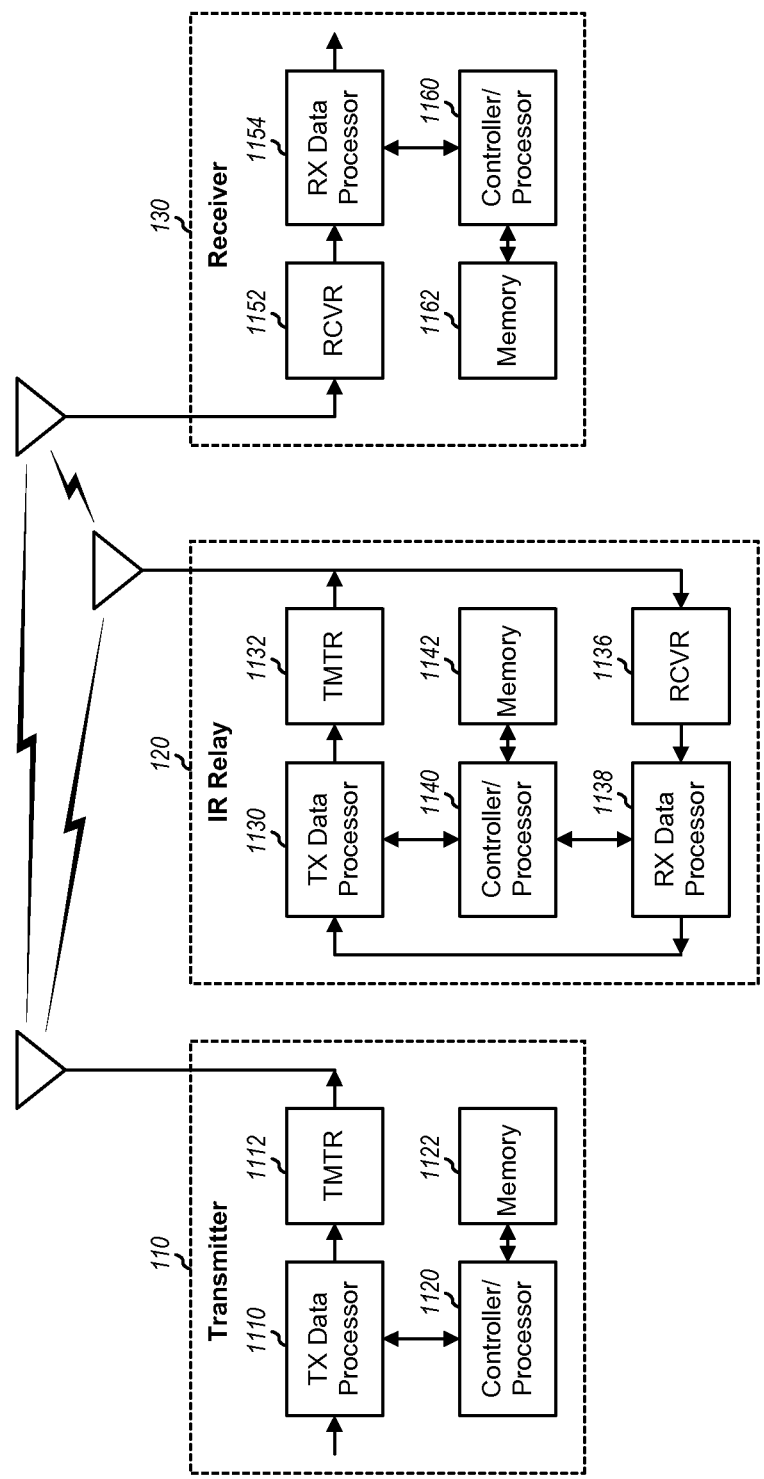
FIG. 11 shows a block diagram of a transmitter, a relay, and a receiver.

FIG. 11 shows a block diagram of a design of transmitter 110, IR relay 120, and receiver 130. At transmitter 110, a transmit (TX) data processor 1110 may receive packets of data to broadcast and may process (e.g., encode and modulate) each packet in accordance with a selected packet format to obtain data symbols. Processor 1110 may generate multiple (N) transmissions of each packet and may provide one transmission at a time. Processor 1110 may also process control information (e.g., for system information, assignment messages, etc.) to obtain control symbols. Processor 1110 may multiplex the data symbols, the control symbols, and pilot symbols and may further process the multiplexed symbols (e.g., for CDMA, OFDM, etc.) to generate output samples. A transmitter (TMTR) 1112 may condition (e.g., convert to analog, amplify, filter, and upconvert) the output samples to generate a forward link signal, which may be transmitted to IR relay 120 and receiver 130.

At IR relay 120, the forward link signal from transmitter 110 may be received and provided to a receiver (RCVR) 1136. Receiver 1136 may condition (e.g., filter, amplify, downconvert, and digitize) the received signal and provide input samples. A receive (RX) data processor 1138 may process the input samples (e.g., for CDMA, OFDM, etc.) to obtain received symbols. Processor 1138 may perform detection on the received symbols to obtain detected symbols and may further process (e.g., demodulate and decode) the detected symbols to recover the packets and control information sent by transmitter 110. A TX data processor 1130 may process (e.g., encode and modulate) each correctly decoded packet in the same manner as transmitter 110 to obtain data symbols. Processor 1130 may multiplex the data symbols with pilot symbols and may further process the multiplexed symbol to obtain output samples for remaining transmissions of each correctly decoded packet. A transmitter 1132 may condition the output samples from processor 1130 and generate a relay signal, which may be transmitted to receiver 130.

At receiver 130, the forward link signal from transmitter 110 and the relay signal from IR relay 120 may be received and conditioned by a receiver 1152 and further processed by an RX data processor 1154 to recover the packets and control information sent by transmitter 110. Processor 1154 may derive a channel estimate for each transmission of a packet based on received pilot symbols for that transmission. Processor 1154 may perform coherent detection on received data symbols and received control symbols with the channel estimate to obtain detected symbols. Processor 1154 may further process (e.g., demodulate and decode) the detected symbols to recover the packets sent by transmitter 110.

Controllers/processors 1120, 1140 and 1160 may direct operation at transmitter 110, IR relay 120, and receiver 130, respectively. Controller/processor 1140 may perform or direct process 500 in FIG. 5, process 900 in FIG. 9, and/or other processes for the techniques described herein. Controller/processor 1160 may perform or direct process 700 in FIG. 7 and/or other processes for the techniques described herein. Memories 1122, 1142 and 1162 may store data and program codes for transmitter 110, IR relay 120, and receiver 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a signal including at least one transmission of a packet from a transmitter at a relay, the at least one transmission being at least one of multiple transmissions of the packet broadcast by the transmitter to receivers;
processing the at least one transmission of the packet to decode the packet;
until the packet is decoded correctly:
reconditioning the signal received including at least one transmission of a packet received from the transmitter, and
transmitting the reconditioned signal from the relay;
after the packet is decoded correctly:
generating at least one remaining transmission of the packet at the relay, the at least one remaining transmission being generated by the relay in a same manner as the remaining ones of the multiple transmissions of the packet to be broadcast by the transmitter, the same manner comprising encoding and modulating the packet in accordance with a packet format utilized by the transmitter to obtain modulated data symbols for the at least one remaining transmission of the packet;
determining resources used by the transmitter to send the at least one remaining transmission of the packet; and
sending the at least one remaining transmission of the packet from the relay on the same resources used by the transmitter;
wherein the generating the at least one remaining transmission of the packet comprises, for each remaining transmission,
mapping data symbols for the remaining transmission to resources used by the transmitter for data,
mapping pilot symbols to resources used by the transmitter for pilot, and
generating the remaining transmission based on the mapped data symbols and the mapped pilot symbols.

2. The method of claim 1, wherein the transmitter broadcasts a fixed number of transmissions of the packet regardless of decoding results by the receivers.

3. The method of claim 1, wherein the multiple transmissions of the packet are hybrid automatic repeat request (HARQ) transmissions comprising different redundancy information for the packet.

4. The method of claim 1, wherein the sending the at least one remaining transmission of the packet comprises sending each remaining transmission of the packet from the relay at same time that the transmitter is sending the remaining transmission.

5. The method of claim 1, further comprising:
determining a packet format used by the transmitter for the packet, wherein the at least one transmission of the packet is processed in accordance with the packet format to decode the packet, and wherein the at least one remaining transmission of the packet is generated in accordance with the packet format.

6. The method of claim 1, further comprising:
receiving at least one transmission of a message from the transmitter at the relay, the message comprising information used to receive the packet;
processing the at least one transmission of the message to decode the message;
generating at least one remaining transmission of the message after correctly decoding the message; and sending the at least one remaining transmission of the message from the relay.

7. The method of claim 6, wherein the message comprises system information.

8. The method of claim 6, wherein the message comprises an assignment for the packet.

9. The method of claim 1, wherein the at least one remaining transmission of the packet is sent from the relay in accordance with the transmit timing of the relay.

10. The method of claim 1, further comprising:
determining a transmit power level for the relay such that received power of transmissions from the relay is within a predetermined range at a receiver, and wherein the at least one remaining transmission of the packet is sent from the relay at the determined transmit power level.

11. The method of claim 1, further comprising:
sending no transmissions of the packet from the relay if the packet has not been decoded correctly.

12. The method of claim 1, wherein the transmitter is a broadcast station in a broadcast network, and wherein the packet is for a broadcast stream sent by the broadcast station to the receivers.

13. The method of claim 1, wherein the at least one remaining transmission of the packet from the relay is sent on the same frequency used by the transmitter.

14. An apparatus for wireless communication, comprising:
at least one processor configured to:
receive a signal including at least one transmission of a packet from a transmitter at a relay, the at least one transmission being at least one of multiple transmissions of the packet broadcast by the transmitter to receivers,
process the at least one transmission of the packet to decode the packet, the at least one remaining transmission being remaining ones of the multiple transmissions of the packet,
until the packet is decoded correctly, recondition the signal including at least one transmission of a packet received from the transmitter, and transmit the reconditioned signal from the relay, and
after the packet is decoded correctly, generate at least one remaining transmission of the packet at the relay, the at least one remaining transmission being generated by the relay in a same manner as the remaining ones of the multiple transmissions of the packet to be broadcast by the transmitter, the same manner comprising encoding and modulating the packet in accordance with a packet format utilized by the transmitter to obtain modulated data symbols for the at least one remaining transmission of the packet, determine resources used by the transmitter to send the at least one remaining transmission of the packet, and send the at least one remaining transmission of the packet from the relay on the same resources used by the transmitter, wherein for each remaining transmission of the packet the at least one processor is configured to map data symbols for the remaining transmission to resources used by the transmitter for data, to map pilot symbols to resources used by the transmitter for pilot, and to generate the remaining transmission based on the mapped data symbols and the mapped pilot symbols; and
a memory coupled to the at least one processor.

15. The apparatus of claim 14, wherein the at least one processor is configured to determine a packet format used by the transmitter for the packet, to process the at least one transmission of the packet in accordance with the packet format to decode the packet, and to generate the at least one remaining transmission of the packet in accordance with the packet format.

16. An apparatus for wireless communication, comprising:
means for receiving a signal including at least one transmission of a packet from a transmitter at a relay, the at least one transmission being at least one of multiple transmissions of the packet broadcast by the transmitter to receivers;
means for processing the at least one transmission of the packet to decode the packet;
means for reconditioning the signal including at least one transmission of a packet received from the transmitter, until the packet is decoded correctly;
means for transmitting the reconditioned signal from the relay, until the packet is decoded correctly;
means for generating at least one remaining transmission of the packet after the packet is decoded correctly, the at least one remaining transmission being generated by the relay in a same manner as the remaining ones of the multiple transmissions of the packet to be broadcast by the transmitter, the same manner comprising encoding and modulating the packet in accordance with a packet format utilized by the transmitter to obtain modulated data symbols for the at least one remaining transmission of the packet;
means for determining resources used by the transmitter to send the at least one remaining transmission of the packet, after the packet is decoded correctly; and
means for sending the at least one remaining transmission of the packet from the relay on the resources used by the transmitter, after the packet is decoded correctly;
wherein the means for generating at least one remaining transmission of the packet comprises, for each remaining transmission,
means for mapping data symbols for the remaining transmission to resources used by the transmitter for data,
means for mapping pilot symbols to resources used by the transmitter for pilot, and
means for generating the remaining transmission based on the mapped data symbols and the mapped pilot symbols.

17. The apparatus of claim 16, further comprising:
means for determining a packet format used by the transmitter for the packet,
wherein the at least one transmission of the packet is processed in accordance with the packet format to decode the packet, and
wherein the at least one remaining transmission of the packet is generated in accordance with the packet format.

18. A computer program product, comprising:
a non-transitory computer-readable medium comprising:
code for causing at least one computer to receive at least one transmission of a packet from a transmitter at a relay, the at least one transmission being at least one of multiple transmissions of the packet broadcast by the transmitter to receivers,
code for causing the at least one computer to process the at least one transmission of the packet to decode the packet,
code for causing the at least one computer to recondition the signal including at least one transmission of a packet received from the transmitter, until the packet is decoded correctly,
code for causing the at least one computer to transmit the reconditioned signal from the relay, until the packet is decoded correctly, code for causing the at least one computer to generate at least one remaining transmission of the packet after the packet is decoded correctly, the at least one remaining transmission being generated by the relay in a same manner as the remaining ones of the multiple transmissions of the packet to be broadcast by the transmitter, the same manner comprising encoding and modulating the packet in accordance with a packet format utilized by the transmitter to obtain modulated data symbols for the at least one remaining transmission of the packet, code for causing the at least one computer to determine resources used by the transmitter to send the at least one remaining transmission of the packet, after the packet is decoded correctly, and code for causing the at least one computer to send the at least one remaining transmission of the packet from the relay on the same resources used by the transmitter, after the packet is decoded correctly;

wherein the code for causing the at least one computer to generate at least one remaining transmission of the packet comprises code for causing the at least one computer to, for each remaining transmission, map data symbols for the remaining transmission to resources used by the transmitter for data, map pilot symbols to resources used by the transmitter for pilot, and generate the remaining transmission based on the mapped data symbols and the mapped pilot symbols.

19. A method for wireless communication, comprising:
receiving at least one transmission of a message from a transmitter, the message comprising information used to receive a packet in a different transmission;
receiving a signal including at least one transmission of the packet from the transmitter, the at least one transmission of the packet being at least one of multiple transmissions of the packet broadcast by the transmitter to receivers;
receiving at least one additional transmission of the packet from the transmitter, the at least one additional transmission being at least one remaining one of the multiple transmissions of the packet;
receiving a repeated signal from a relay until the packet is decoded correctly by the relay, the repeated signal based upon the received signal;
receiving at least one additional transmission of the packet from the relay on the same resources used by the transmitter, after the packet is decoded correctly by the relay, the at least one additional transmission being generated by the relay in a same manner as the at least one remaining one of the multiple transmissions of the packet to be broadcast by the transmitter, the same manner comprising encoding and modulating the packet in accordance with a packet format utilized by the transmitter to obtain modulated data symbols for the at least one remaining transmission of the packet; and
processing the at least one transmission and the at least one additional transmission of the packet to decode the packet;
wherein processing the at least one transmission and the at least one additional transmission of the packet comprises, for each of the at least one transmission,
deriving a first channel estimate for the transmitter based on pilot symbols in the transmission;
performing detection for the transmission based on the first channel estimate;

deriving a second channel estimate for both the transmitter and the relay based on pilot symbols in the additional transmission; and
performing detection for the additional transmission based on the second channel estimate.

20. The method of claim 19, wherein the transmitter broadcasts a fixed number of transmissions of the packet regardless of decoding results by the receivers, and wherein the multiple transmissions of the packet are hybrid automatic repeat request (HARQ) transmissions comprising different redundancy information for the packet.

21. The method of claim 19, further comprising:
receiving at least one additional transmission of the message from the transmitter and the relay; and
processing the at least one transmission and the at least one additional transmission of the message to decode the message.

22. The method of claim 21, further comprising:
obtaining system information from the message, and wherein the at least one transmission and the at least one additional transmission of the packet are received in accordance with the system information.

23. The method of claim 21, further comprising:
obtaining an assignment from the message, and wherein the at least one transmission and the at least one additional transmission of the packet are received and processed in accordance with the assignment.

24. The method of claim 19, further comprising:
determining timing adjustment for the relay such that transmissions from the relay are received within a predetermined time window of transmissions from the transmitter at a receiver; and
sending the timing adjustment to the relay.

25. The method of claim 19, further comprising:
operating in an awake state during the at least one transmission and the at least one additional transmission of the packet; and
operating in a sleep state for remaining ones of the multiple transmissions of the packet.

26. The method of claim 19, wherein the at least one additional transmission of the packet from the transmitter and a relay is received on the same frequency.

27. An apparatus for wireless communication, comprising:
at least one processor configured to:
receive at least one transmission of a message from a transmitter, the message comprising information used to receive the packet in a different transmission,
receive a signal including at least one transmission of a packet from the transmitter, the at least one transmission of the packet being at least one of multiple transmissions of the packet broadcast by the transmitter to receivers,
receive at least one additional transmission of the packet from the transmitter the at least one additional transmission being at least one remaining one of the multiple transmissions of the packet,
receive a repeated signal from a relay until the packet is decoded correctly by the relay, the repeated signal based upon the received signal,
receive at least one additional transmission of the packet from the relay on the same resources used by the transmitter, after the packet is decoded correctly by the relay, the at least one additional transmission being generated by the relay in a same manner as the at least one remaining one of the multiple transmissions of the packet to be broadcast by the transmitter, the same manner comprising encoding and modulating the packet in accordance with a packet format utilized by the transmitter to obtain modulated data symbols for the at least one remaining transmission of the packet, process the at least one transmission and the at least one additional transmission of the packet to decode the packet, wherein the at least one processor is configured to derive a first channel estimate for the transmitter for each transmission of the packet based on pilot symbols in the transmission, to perform detection for each transmission of the packet based on the first channel estimate for the transmission, to derive a second channel estimate for both the transmitter and the relay for each additional transmission of the packet based on pilot symbols in the additional transmission, and to perform detection for each additional transmission of the packet based on the second channel estimate for the additional transmission; and a memory coupled to the at least one processor.

28. The apparatus of claim 27, wherein the at least one processor is configured to determine timing adjustment for the relay such that transmissions from the relay are received within a predetermined time window of transmissions from the transmitter at a receiver, and to send the timing adjustment to the relay.

29. A method for wireless communication, comprising:

receiving a signal including at least one transmission of a packet from a transmitter at a relay;

processing the at least one transmission of the packet to decode the packet;

until the packet is decoded correctly:

reconditioning the signal including at least one transmission of a packet received from the transmitter; and transmitting the reconditioned signal from the relay;

after the packet is decoded correctly:

generating at least one additional transmission of the packet at the relay, the at least one additional transmission being generated by the relay in a same manner as a remaining one of multiple transmissions of the packet to be broadcast by the transmitter, the same manner comprising encoding and modulating the packet in accordance with a packet format utilized by the transmitter to obtain modulated data symbols for the at least one remaining transmission of the packet;

determining resources used by the transmitter to send the at least one additional transmission of the packet;

adjusting transmit timing of the relay such that transmissions from the relay are received within a predetermined time window of transmissions from the transmitter at a receiver; and sending the at least one additional transmission of the packet in accordance with the transmit timing from the relay to the receiver on the same resources used by the transmitter;

wherein generating the at least one remaining transmission of the packet comprises, for each remaining transmission, mapping data symbols for the remaining transmission to resources used by the transmitter for data, mapping pilot symbols to resources used by the transmitter for pilot, and generating the remaining transmission based on the mapped data symbols and the mapped pilot symbols.

30. The method of claim 29, wherein the adjusting transmit timing of the relay comprises receiving timing adjustment from the receiver, and adjusting the transmit timing of the relay in accordance with the timing adjustment.

31. The method of claim 29, wherein the adjusting transmit timing of the relay comprises determining receive timing of the relay based on the at least one transmission of the packet from the transmitter, and setting the transmit timing of the relay based on the receive timing of the relay.

32. An apparatus for wireless communication, comprising:

at least one processor configured to:

receive at least one transmission of a packet from a transmitter at a relay, process the at least one transmission of the packet to decode the packet, until the packet is decoded correctly, recondition the signal including at least one transmission of a packet received from the transmitter, and transmit the reconditioned signal from the relay, after the packet is decoded correctly, generate at least one additional transmission of the packet at the relay, the at least one additional transmission being generated by the relay in a same manner as a remaining one of multiple transmissions of the packet to be broadcast by the transmitter, the same manner comprising encoding and modulating the packet in accordance with a packet format utilized by the transmitter to obtain modulated data symbols for the at least one remaining transmission of the packet, determine resources used by the transmitter to send the at least one additional transmission of the packet, adjust transmit timing of the relay such that transmissions from the relay are received within a predetermined time window of transmissions from the transmitter at a receiver, and send the at least one additional transmission of the packet in accordance with the transmit timing from the relay to the receiver on the same resources used by the transmitter, wherein for each remaining transmission of the packet the at least one processor is configured to map data symbols for the remaining transmission to resources used by the transmitter for data, to map pilot symbols to resources used by the transmitter for pilot, and to generate the remaining transmission based on the mapped data symbols and the mapped pilot symbols; and a memory coupled to the at least one processor.

33. The apparatus of claim 32, wherein the at least one processor is configured to receive timing adjustment from the receiver and to adjust the transmit timing of the relay in accordance with the timing adjustment.

34. The apparatus of claim 32, wherein the at least one processor is configured to determine receive timing of the relay based on the at least one transmission of the packet from the transmitter, and to set the transmit timing of the relay based on the receive timing of the relay.

35. An apparatus for wireless communication, comprising:

means for receiving at least one transmission of a message from a transmitter, the message comprising information used to receive a packet in a different transmission;

means for receiving a signal including at least one transmission of the packet from the transmitter, the at least one transmission of the packet being at least one of multiple transmissions of the packet broadcast by the transmitter to receivers;

means for receiving at least one additional transmission of the packet from the transmitter, the at least one additional transmission being at least one remaining one of the multiple transmissions of the packet;

means for receiving a repeated signal from a relay until the packet is decoded correctly by the relay, the repeated signal based upon the received signal;

means for receiving at least one additional transmission of the packet from the relay on the same resources used by the transmitter, after the packet is decoded correctly by the relay, the at least one additional transmission being generated by the relay in a same manner as the at least one remaining one of the multiple transmissions of the packet to be broadcast by the transmitter, the same manner comprising encoding and modulating the packet in accordance with a packet format utilized by the transmitter to obtain modulated data symbols for the at least one remaining transmission of the packet; and means for processing the at least one transmission and the at least one additional transmission of the packet to decode the packet;

wherein the means for processing the at least one transmission and the at least one additional transmission of the packet comprises, for each of the at least one transmission, means for deriving a first channel estimate for the transmitter based on pilot symbols in the transmission;

means for performing detection for the transmission based on the first channel estimate;

means for deriving a second channel estimate for both the transmitter and the relay based on pilot symbols in the additional transmission; and means for performing detection for the additional transmission based on the second channel estimate.

36. A computer program product, comprising:
a non-transitory computer-readable medium comprising:
   code for receiving at least one transmission of a message from a transmitter, the message comprising information used to receive a packet in a different transmission;
      code for receiving a signal including at least one transmission of the packet from the transmitter, the at least one transmission of the packet being at least one of multiple transmissions of the packet broadcast by the transmitter to receivers;
   code for receiving at least one additional transmission of the packet from the transmitter, the at least one additional transmission being at least one remaining one of the multiple transmissions of the packet;
   code for receiving a repeated signal from a relay until the packet is decoded correctly by the relay, the repeated signal based upon the received signal;
   code for receiving at least one additional transmission of the packet from the relay on the same resources used by the transmitter, after the packet is decoded correctly by the relay, the at least one additional transmission being generated by the relay in a same manner as the at least one remaining one of the multiple transmissions of the packet to be broadcast by the transmitter, the same manner comprising encoding and modulating the packet in accordance with a packet format utilized by the transmitter to obtain modulated data symbols for the at least one remaining transmission of the packet; and
   code for processing the at least one transmission and the at least one additional transmission of the packet to decode the packet;

wherein the code for processing the at least one transmission and the at least one additional transmission of the packet comprises code for, for each of the at least one transmission, deriving a first channel estimate for the transmitter based on pilot symbols in the transmission;

performing detection for the transmission based on the first channel estimate;

deriving a second channel estimate for both the transmitter and the relay based on pilot symbols in the additional transmission; and performing detection for the additional transmission based on the second channel estimate.

37. An apparatus for wireless communication, comprising:
means for receiving a signal including at least one transmission of a packet from a transmitter at a relay;
means for processing the at least one transmission of the packet to decode the packet;
means for reconditioning the signal including at least one transmission of a packet received from the transmitter, until the packet is decoded correctly;
means for transmitting the reconditioned signal from the relay, until the packet is decoded correctly;
means for generating at least one additional transmission of the packet, if the packet is decoded correctly, the at least one additional transmission being generated by the relay and in a same manner as a remaining one of multiple transmissions of the packet to be broadcast by the transmitter, the same manner comprising encoding and modulating the packet in accordance with a packet format utilized by the transmitter to obtain modulated data symbols for the at least one remaining transmission of the packet;
means for determining resources used by the transmitter to send the at least one additional transmission of the packet, if the packet is decoded correctly;
means for adjusting transmit timing of the relay such that transmissions from the relay are received within a predetermined time window of transmissions from the transmitter at a receiver; and
means for sending the at least one additional transmission of the packet in accordance with the transmit timing from the relay to the receiver on the same resources used by the transmitter, if the packet is decoded correctly:
wherein the means for generating at least one remaining transmission of the packet comprises, for each remaining transmission,
means for mapping data symbols for the remaining transmission to resources used by the transmitter for data,
means for mapping pilot symbols to resources used by the transmitter for pilot, and
means for generating the remaining transmission based on the mapped data symbols and the mapped pilot symbols.

38. A computer program product, comprising:
a non-transitory computer-readable medium comprising:
   code for receiving at least one transmission of a packet from a transmitter at a relay;
   code for processing the at least one transmission of the packet to decode the packet;
   code for reconditioning the signal including at least one transmission of a packet received from the transmitter, until the packet is decoded correctly;
   code for transmitting the reconditioned signal from the relay, until the packet is decoded correctly;
   code for generating at least one additional transmission of the packet, after the packet is decoded correctly, the at least one additional transmission being generated by the relay and in a same manner as a remaining one of multiple transmissions of the packet to be broadcast by the transmitter, the same manner comprising encoding and modulating the packet in accordance with a packet format utilized by the transmitter to obtain modulated data symbols for the at least one remaining transmission of the packet;

code for determining resources used by the transmitter to send the at least one additional transmission of the packet, after the packet is decoded correctly;

code for adjusting transmit timing of the relay such that transmissions from the relay are received within a predetermined time window of transmissions from the transmitter at a receiver, after the packet is decoded correctly; and code for sending the at least one additional transmission of the packet in accordance with the transmit timing from the relay to the receiver on the same resources used by the transmitter, after the packet is decoded correctly;

wherein the code for generating at least one remaining transmission of the packet comprises code for, for each remaining transmission, mapping data symbols for the remaining transmission to resources used by the transmitter for data, mapping pilot symbols to resources used by the transmitter for pilot, and generating the remaining transmission based on the mapped data symbols and the mapped pilot symbols.

\* \* \* \* \*